(12) United States Patent
Neumann et al.

(10) Patent No.: US 9,637,569 B2
(45) Date of Patent: *May 2, 2017

(54) VESSEL FOR SEPARATING COMPONENTS OF A REACTION MIXTURE OBTAINED BY HIGH-PRESSURE POLYMERIZATION OF ETHYLENICALLY UNSATURATED MONOMERS WITH INTEGRATED BURSTING DISCS

(71) Applicant: Basell Polyolefine GmbH, Wesseling (DE)

(72) Inventors: Erich Neumann, Braunschweig (DE); Danir Khayrullin, Bruehl (DE); Claudio Fibla, Cologne (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/106,150

(22) PCT Filed: Dec. 15, 2014

(86) PCT No.: PCT/EP2014/077810
§ 371 (c)(1),
(2) Date: Jun. 17, 2016

(87) PCT Pub. No.: WO2015/091384
PCT Pub. Date: Jun. 25, 2015

(65) Prior Publication Data
US 2016/0319046 A1    Nov. 3, 2016

(30) Foreign Application Priority Data

Dec. 19, 2013 (EP) .................................. 13198363

(51) Int. Cl.
*C08F 2/00* (2006.01)
*C08F 4/00* (2006.01)
(Continued)

(52) U.S. Cl.
CPC ............ *C08F 6/10* (2013.01); *B01D 19/0036* (2013.01); *B01D 19/0063* (2013.01); *B01J 3/002* (2013.01);
(Continued)

(58) Field of Classification Search
CPC ......... C08F 6/10; C08F 10/02; B01J 19/2415; B01J 2219/1946; B01J 2219/185; B01J 2219/1943; B01D 19/0063; B01D 19/0036
(Continued)

(56) References Cited

U.S. PATENT DOCUMENTS

| 3,448,750 A | 6/1969 | Parks |
| 4,115,638 A * | 9/1978 | Becker ..................... B01J 3/002 526/352.2 |
| 2013/0295289 A1 | 11/2013 | Littmann et al. |

FOREIGN PATENT DOCUMENTS

| AT | 413265 | 1/2006 |
| WO | WO 2012/084787 A1 | 6/2012 |

OTHER PUBLICATIONS

PCT International Search Report & Written Opinion mailed Feb. 24, 2015 for PCT/EP2014/077810.

* cited by examiner

*Primary Examiner* — William Cheung (57) ABSTRACT

The present disclosure relates to a vessel for separating, at a pressure of from 10 MPa to 50 MPa, a composition comprising liquid components and gaseous components into a liquid fraction and a gaseous fraction, wherein (Continued)

the separation vessel has a vertically arranged cylindrical shape, has at its top a manhole, which is surrounded by a thickened by a part of the separation vessel wall;

and bears at least one bursting disc which is held by a bursting disc holder which is installed pressure-tight within a boring in the thickened part of the separation vessel wall.

11 Claims, 5 Drawing Sheets

(51) Int. Cl.

| | | |
|---|---|---|
| *C08F 210/00* | (2006.01) | |
| *B01J 10/00* | (2006.01) | |
| *B01J 19/18* | (2006.01) | |
| *C08F 6/10* | (2006.01) | |
| *B01J 3/00* | (2006.01) | |
| *B01D 19/00* | (2006.01) | |
| *B01J 19/24* | (2006.01) | |
| *C08F 10/02* | (2006.01) | |

(52) U.S. Cl.
CPC ........... *B01J 19/2415* (2013.01); *C08F 10/02* (2013.01); *B01J 2219/185* (2013.01); *B01J 2219/1943* (2013.01); *B01J 2219/1946* (2013.01); *Y02P 20/582* (2015.11)

(58) Field of Classification Search
USPC ................... 526/64, 222, 348; 422/129, 132
See application file for complete search history.

VESSEL FOR SEPARATING COMPONENTS OF A REACTION MIXTURE OBTAINED BY HIGH-PRESSURE POLYMERIZATION OF ETHYLENICALLY UNSATURATED MONOMERS WITH INTEGRATED BURSTING DISCS

This applications the U.S. National Phase of PCT International Application PCT/EP2014/077810, filed Dec. 15, 2014, claiming benefit of priority to European Patent Application No. 1319863.7, filed Dec. 19, 2013, the disclosures of which are incorporated herein by reference in their entirety.

FIELD OF THE INVENTION

The present disclosure relates to a vessel for separating, at a pressure of from 10 MPa to 50 MPa, a composition comprising liquid components and gaseous components into a liquid fraction and a gaseous fraction. In some embodiments, the present disclosure relates to processes for separating, at a pressure of from 10 MPa to 50 MPa, a composition comprising liquid components and gaseous components into a liquid fraction and a gaseous fraction, and it relates to processes for preparing ethylene homopolymers or copolymers from ethylenically unsaturated monomers in the presence of free-radical polymerization initiators, wherein the separation of the reaction mixture obtained by the polymerization is carried out in such a separation vessel.

BACKGROUND OF THE INVENTION

Polyethylene is the most widely used commercial polymer and can be prepared by different processes. For instance, polymerization in the presence of free-radical initiators at elevated pressures was the method first discovered for producing polyethylene and continues to be a valued process with high commercial relevance for the preparation of low density polyethylene (LDPE).

A normal set-up of a plant for preparing low density polyethylene comprises a polymerization reactor, which can be an autoclave or a tubular reactor or a combination of such reactors, and further equipment. For pressurizing the reaction components, usually a set of two compressors, a primary and a secondary compressor, is used. At the end of the polymerization sequence, a high-pressure polymerization unit may further include apparatuses like extruders and granulators for pelletizing the resulting polymer. Furthermore, the polymerization unit may also comprise means for feeding monomers and comonomers, free-radical initiators, modifiers or other substances at one or more positions to the polymerization reaction.

A characteristic of the radically initiated polymerization of ethylenically unsaturated monomers under high pressure is that the conversion of the monomers is generally not completed after one round (pass) of processing. For instance, for each pass of the reactor, only about 10% to 50% of the dosed monomers are converted in a polymerization process performed in a tubular reactor, and from 8% to 30% of the dosed monomers are converted in the case of a polymerization in an autoclave reactor. Accordingly, it is common practice to separate the discharged reaction mixture into polymeric and gaseous components and recycle the monomers. To avoid unnecessary decompression and compression steps, the separation into polymeric and gaseous components is usually carried out in two stages. The monomer-polymer mixture leaving the reactor is transferred to a first separating vessel, frequently called the high-pressure product separator, in which the separation in polymeric and gaseous components is carried out at a pressure that allows for recycling of the ethylene and comonomers separated from the monomer-polymer mixture to the reaction mixture at a position between the primary compressor and the secondary compressor. At the conditions of operating the first separation vessel, the polymeric components within the separating vessel are in liquid state. The level of the liquid phase in the first separating vessel is generally measured by radiometric level measurement and is controlled automatically by a product discharge valve. The liquid phase obtained in the first separating vessel is transferred to a second separation vessel, frequently called the low-pressure product separator, in which further separation in polymeric and gaseous components takes place at lower pressure. The ethylene and comonomers separated from the mixture in the second separation vessel are fed to the primary compressor where they are compressed to the pressure of the fresh ethylene feed, combined with the fresh ethylene feed, and the joined streams are further pressurized to the match the pressure of the high-pressure gas recycle stream.

The first separation vessel, which generally operates at a pressure in the range of from 10 MPa to 50 MPa, is usually equipped with safety devices for protecting the vessel from over-pressurization. The commonly utilized devices are bursting discs, which are usually installed at the exit lines of the separation vessels through which the gaseous fraction exits the separation vessel for recycling to the secondary compressor. To prevent blocking of the bursting discs by polymer entrained by the recycle gas, dead space in front of the bursting discs should be avoided. For safety reasons, the bursting discs may be installed within a massive steel block.

Modern world-scale plants are generally designed with a higher capacity for a single production line than older plants. Due to the higher throughput, separating vessels of a larger dimension may be used, and accordingly the volume which has to be depressurized by failing bursting discs increases. Since the diameter of available bursting discs is limited, this set-up requires the installation of more than one bursting disc for sufficiently fast pressure release. Moreover, the installation of a bursting disc unit requires a certain assembling volume and the bursting discs should be installed directly at lines with permanent gas flow to avoid "dead space." It has therefore become necessary to convey the gas exiting the separation vessel through more than one exit line to establish enough capability for installing bursting discs in the proximity of the first separation vessel.

Accordingly, it was the objective of the present disclosure to overcome the disadvantages of the prior art and provide a separation vessel with a dead-space-free installation of one or more busting discs, where separation vessel has a relatively simple design and can be constructed economically, where the separation vessel does not require a split of the gas leaving the separation vessel to pass through more than one exit line, and an installation of bursting discs in separate massive steel blocks can be advantageously avoided.

SUMMARY OF THE INVENTION

In general, the present disclosure relates to a vessel for separating, at a pressure of from 10 MPa to 50 MPa, a composition comprising liquid components and gaseous components into a liquid fraction and a gaseous fraction, wherein
the separation vessel has a cylindrical shape and is vertically arranged, the separation vessel has at its top a manhole, which is surrounded by a thickened part of the separation vessel wall;

the separation vessel is equipped with means for introducing the composition into the separation vessel, with means for withdrawing a gaseous fraction from the top of the separation vessel, and with means for withdrawing a liquid fraction from the bottom of the separation vessel; and the separation vessel bears at least one bursting disc held by a bursting disc holder, which is installed "pressure-tight" within a boring in the thickened part of the separation vessel wall.

In some embodiments, the present disclosure relates to a process for separating, at a pressure of from 10 MPa to 50 MPa, a composition comprising liquid components and gaseous components into a liquid fraction and a gaseous fraction, and a process for preparing ethylene homopolymers or copolymers from ethylenically unsaturated monomers in the presence of free-radical polymerization initiators at temperatures from 100° C. to 350° C. and pressures in the range of from 110 MPa to 500 MPa in a polymerization reactor, wherein the separation of the reaction mixture obtained by the polymerization is carried out in a separation vessel.

DETAILED DESCRIPTION OF THE INVENTION

In certain embodiments, the present disclosure relates to a vessel for separating, at a pressure of from 10 MPa to 50 MPa and from 20 MPa to 30 MPa, a composition comprising liquid components and gaseous components into a liquid fraction and a gaseous fraction. The separation vessel is equipped with means for introducing the composition into the separation vessel, with means for withdrawing a gaseous fraction from the top of the separation vessel, and with means for withdrawing a liquid fraction from the bottom of the separation vessel. The means for withdrawing a gaseous fraction from the top of the separation vessel is, in certain embodiments, a gas outlet at the top of the separation vessel. The means for withdrawing the liquid fraction from the bottom of the separation vessel may comprise an outlet for a liquid phase at the bottom of the separation vessel. In further embodiments, the lower end of the separation vessel is formed as cone.

The separation vessel according to the present disclosure has a cylindrical shape and is vertically arranged. In certain embodiments, the separation vessel has a ratio of length to diameter L/D of from 4 to 10, such as from 5 to 8. The values for the vessel length and the vessel diameter refer to the inner dimensions. In some embodiments, the length of the separation vessel is in the range of from 3 meters to 20 meters, including in the range of from 5 meters to 15 meters. The vessel diameter may be in the range of from 0.5 meter to 2.5 meter, such as from 1 meter to 2 meters. If the lower end of the separation vessel is formed as cone, the height of the cone is included in the vessel length.

The separation vessel has at its top a manhole, which is surrounded by a thickened part of the separation vessel wall. In some embodiments, the diameter of the manhole is at least 0.4 meters, such as in the range of from 0.5 meters to 0.8 meters. The thickened part of the separation vessel wall at the top of the separation vessel comes from a design that the diameter of the manhole is smaller than the inner diameter of the separation vessel in its cylindrical part while the outer diameter of the separation vessel in the region of the manhole is not reduced by the same ratio. In further embodiments, the separation vessel is constructed in a way that the outer diameter of the separation vessel remains constant at the top of the vessel, thus the outer diameter of the separation vessel at its top is identical to the outer diameter of the separation vessel in its cylindrical part and the separation vessel accordingly does not taper to its top, while the inner diameter of the separation vessel in its cylindrical part is larger than the diameter of the manhole. Typically, the manhole is closed by a cover, which is usually connected "pressure tight" to the separation vessel body, optionally by screws. In certain embodiments, the screws for connecting the cover with the separation vessel body are mounted to the top of the thickened part of the separation vessel wall.

Typical volumes for separation vessels according to the present disclosure are in the range from 4 $m^3$ to 20 $m^3$. Such separation vessels are, for example, used as high-pressure product separators in high-pressure polymerization plants with an annual capacity of 80,000 to 500,000 tons of LDPE.

The means for introducing the composition into the separation vessel can be an inlet in the wall of the separation vessel. In some embodiments, the means for introducing the composition into the separation vessel is an inlet pipe, commonly also called dip tube, which extends vertically from the top into the separation vessel. Such an inlet pipe may be centrally arranged in the separation vessel and integrated into the cover of the manhole. In further embodiments, the inlet pipe is connected to the cover via a removable flange.

For inlet pipes used in accordance with certain embodiments, the ratio of the inner diameter of the inlet pipe at its lower end, i.e. at the outlet of the pipe, and the inner diameter of the separating vessel in its cylindrical part is in the range of from 0.2 to 0.4, including from 0.22 to 0.35. The determination of the ratio of the inner diameter of the inlet pipe at its lower end to the inner diameter of the separating vessel in its cylindrical part may be achieved by utilizing, as an inlet pipe, a tube which widens in its lower part. The inlet pipe can optionally be remounted, i.e. pulled out of the separation vessel, by disconnecting a special manhole flange on top of the vessel.

According to one embodiment of the present disclosure, the inlet pipe extends for a distance into the separation vessel, which is from 25% to 50% of the length of the separation vessel, including from 30% to 40% of the length of the separation vessel, in particular embodiments.

In some embodiments, the separation vessel according to the present disclosure is characterized in that the separation vessel bears at least one bursting disc which is held by a bursting disc holder is installed pressure-tight within a boring in the thickened part of the separation vessel wall. Bursting discs, also known as rupture discs, are non-reclosing pressure relief devices which protect pressure vessels or pressure systems as final protection elements from over-pressurization. Bursting discs provide instant response to a pressure increase, but once the disc has ruptured it will not reseal. The bursting disc, which is intended to fail if an over-pressurization occurs, therefore has to be integrated in a way into the vessel or system to be protected that an uncomplicated possibility for replacing failed busting discs exists. Therefore, according to the present disclosure, the bursting disc is held by a holder to which the bursting disc is fixed, such as by an assembly nut or screw, for forming a bursting disc assembly. The bursting disc holder is connected "pressure-tight" to the separation vessel body. In certain embodiments, the bursting disc holder is fixed to the separation vessel wall by flange connection from the outside.

In case the bursting disc fails, the contents of the separation vessel can expand through the opening, which was generated by the failing bursting disc, in an appropriate manner. Accordingly, the bursting disc holder may be connected to a vent line which allows conveying, in an emergency situation, the contents of the separation vessel to a safe location such as a flare or to the atmosphere, for example via a blowdown vessel. Since parts of the failing bursting disc will be shot out through the bursting disc holder, in certain embodiments devices for adsorbing the kinetic energy, so-called "catchers," may be installed at suitable positions in the vent lines in a way that the parts of the failing bursting discs neither plug nor evacuate the vent lines. Devices for adsorbing the kinetic energy may be, for example, piping ends filled with lead.

According to the present disclosure, the bursting disc holder is installed in a boring in the thickened part of the separation vessel wall. This region of the separation vessel has sufficient stability that one or more holes can be drilled without compromising the pressure resistance of the separation vessel. In some embodiments, the thickened part at the top of the separation vessel wall has at least two borings, one boring which acts as outlet for withdrawing a gaseous fraction from the top of the separation vessel and at least one boring for installing the bursting disc holder. Since up to eight holes can easily be drilled at the same height level into the thickened part of the separation vessel wall, separation vessels for use in the present disclosure may have one boring, which acts as outlet for withdrawing a gaseous fraction from the top of the separation vessel, and from 1 to 7 borings for installing bursting disc holders. Additionally, separation vessel have one boring as described above and from 1 to 3 borings for installing bursting disc holders.

In some embodiments, the bursting discs are arranged dead-space-free, i.e. in a way that there exists no or essentially no space for build-up of a plugging in front of the bursting disc, at a position which is in contact with the gaseous fraction within the separation vessel. The bursting discs may be arranged at the inner end of the boring in the thickened part of the separation vessel wall in a way that the surface of the bursting disc assembly in contact with the gaseous fraction within the separation vessel, such that the wall surface of the manhole is arranged in one plane. Constructional reasons may dictate that the outer surface of the bursting disc is not exactly at the level of the outer surface of the bursting disc assembly. In certain embodiments, the bursting disc is fixed to the bursting disc holder by a clamping nut which embraces the bursting disc at its outer edge and leaves the central part uncovered. Such a gap between the bursting disc and the wall surface of the manhole, i.e. the distance between the plane of the outer surface of the bursting disc and the plane of the wall surface of the manhole, is commonly in the magnitude of several millimeters and often in the range of from 2 to 10 mm.

The separation vessels of the present disclosure may be employed as high-pressure product separators in a high-pressure polymerization of ethylenically unsaturated monomers in the presence of free-radical polymerization initiators. The high-pressure polymerization, in some embodiments, is a homopolymerization of ethylene or a copolymerization of ethylene with one or more other monomers, provided that these monomers are free-radically copolymerizable with ethylene under high pressure. Examples of suitable copolymerizable monomers are $\alpha,\beta$-unsaturated $C_3$-$C_8$-carboxylic acids, such as maleic acid, fumaric acid, itaconic acid, acrylic acid, methacrylic acid and crotonic acid, derivatives of $\alpha,\beta$-unsaturated $C_3$-$C_8$-carboxylic acids, e.g. unsaturated $C_3$-$C_{15}$-carboxylic esters, such as esters of $C_1$-$C_6$-alkanols, or anhydrides, such as methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. In addition, vinyl carboxylates such as vinyl acetate, can be used as comonomers. Propene, 1-butene, 1-hexene, acrylic acid, n-butyl acrylate, tert-butyl acrylate, 2-ethylhexyl acrylate, vinyl acetate or vinyl propionate are suitable as for use as comonomers in the present technology.

In the case of copolymerization, the proportion of comonomer or comonomers in the reaction mixture is from 1 to 50% by weight, such as from 3 to 40% by weight, based on the amount of monomers, i.e. the sum of ethylene and other monomers. Depending on the type of comonomer, in some embodiments feeding the comonomers occurs at more than one point to the reactor set-up. In certain embodiments, the comonomers are fed to the suction side of the secondary compressor.

For the purposes of the present disclosure, polymers or polymeric materials are all substances which are made up of at least two monomer units. The polymers or polymeric materials may be low density polyethylenes having an average molecular weight $M_n$ of more than 20 000 g/mole. The term "low density polyethylene" includes ethylene homopolymers and ethylene copolymers. The process of the present disclosure can also be advantageously employed in the preparation of oligomers, waxes and polymers having a molecular weight $M_n$ of less than 20 000 g/mole.

Possible initiators for starting the free-radical polymerization in the respective reaction zones are, in general, all substances that can produce radical species under the conditions in the polymerization reactor, for example, oxygen, air, azo compounds or peroxidic polymerization initiators. In one embodiment of the present disclosure, the polymerization is carried out by using oxygen, either fed in the form of pure $O_2$ or as air. In the case of initiating the polymerization with oxygen, the initiator is normally first mixed with the ethylene feed and then fed to the reactor. In such a case it is not only possible to feed a stream comprising monomer and oxygen to the beginning of the polymerization reactor but also to one or more points along the reactor, creating two or more reaction zones. Initiation using organic peroxides or azo compounds also represents an embodiment of the present disclosure. Examples of suitable organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-sec-butyl peroxydicarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert-butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxybenzoate, methyl isobutyl ketone hydroperoxide, 3,6,9-triethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C-C initiators, e.g. 1,2-diphenyl-1,2-dimethylethane derivatives and 1,1,2,2-tetramethylethane derivatives, are also suitable. It is possible to use either individual initiators or mixtures of various initiators. A large range of initiators, such as peroxides, are commercially available, for example the products of Akzo Nobel available under the trade names Trigonox® and Perkadox®.

Peroxidic polymerization initiators for use in the present disclosure include, for example, 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne, tert-butyl peroxy-3,5,5-trimethylhexanoate, di-(2-ethylhexyl)peroxydicarbonate or tert-butyl peroxy-2-ethylhexanoate.

The initiators can be employed individually or as a mixture in concentrations of from 0.1 mol/t to 50 mol/t of polyethylene produced, such as from 0.2 mol/t to 20 mol/t, in each reaction zone. In one embodiment of the present disclosure, the free-radical polymerization initiator, which is fed to a reaction zone, is a mixture of at least two different azo compounds or organic peroxides. If such initiator mixtures are used, they may fed to all reaction zones. There is no limit for the number of different initiators in such a mixture, however the mixtures are often composed of from two to six initiators, including two, three or four different initiators. In certain embodiments, mixtures of initiators which have different decomposition temperatures are utilized.

In further embodiments, the initiators used in the present disclosure are used in the dissolved state. Examples of suitable solvents for dissolving the initiators are ketones and aliphatic hydrocarbons, including octane, decane and isododecane and other saturated $C_8$-$C_{25}$-hydrocarbons. In some embodiments, the solutions comprise the initiators or initiator mixtures in proportions of from 2 to 65% by weight, such as from 5 to 40% by weight and from 8 to 30% by weight.

In the high-pressure polymerization, the molecular weight of the polymers to be prepared can be altered by addition of modifiers which act as chain-transfers agents. Examples of suitable modifiers are hydrogen, aliphatic and olefinic hydrocarbons, e.g. propane, butane, pentane, hexane, cyclohexane, propene, 1-butene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol, saturated aliphatic aldehydes such as propionaldehyde or 1-olefins such as propene, 1-butene or 1-hexene, or aliphatic hydrocarbons such as propane.

The high-pressure polymerization may be carried out, in some embodiments, at pressures of from 110 MPa to 500 MPa, from 160 MPa to 350 MPa and from 200 MPa to 330 MPa for polymerization in a tubular reactor, and with pressures of from 110 MPa to 300 MPa and p from 120 MPa to 280 MPa for polymerization in an autoclave reactor. The polymerization temperatures are, in further embodiments, in the range of from 100° C. to 350° C., from 180° C. to 340° C. and from 200° C. to 330° C. for polymerization in a tubular reactor, and in the range of from 110° C. to 320° C. and from 120° C. to 310° C. for polymerization in an autoclave reactor.

The polymerization can be carried out with all types of high-pressure reactors appropriate for high-pressure polymerization. Suitable high-pressure reactors are, for example, tubular reactors or autoclave reactors or combinations of such reactors. In certain embodiments, the high-pressure reactors are tubular reactors or autoclave reactors.

Common high-pressure autoclave reactors are stirred reactors and have a length-to-diameter ratio of in the range from 2 to 30, such as from 2 to 20. Such autoclave reactors have one or more reaction zones, including from 1 to 6 reaction zones and from 1 to 4 reaction zones. The number of reaction zones depends from the number of agitator baffles which separate individual mixed zones within the autoclave reactor.

Appropriate tubular reactors are basically long, thick-walled pipes, which are usually from about 0.5 km to 4 km, such as from 1 km to 3 km and from 1.5 km to 2.5 km long. The inner diameter of the pipes is usually in the range of from about 30 mm to 120 mm, including from 60 mm to 100 mm. In certain embodiments, tubular reactors for use in the present disclosure have a length-to-diameter ratio of greater than 1000, including from 10000 to 40000 and from 25000 to 35000.

Tubular reactors for use in the present technology have, in some embodiments, at least two reaction zones, such as from 2 to 6 reaction zones and from 2 to 5 reaction zones. The number of reaction zones is given by the number of feeding points for the initiator. Such a feeding point can, for example, be an injection point for a solution of azo compounds or organic peroxides. Fresh initiator is added to the reactor, where it decomposes into free radicals and initiates further polymerization. The generated heat of the reaction increases the temperature of the reaction mixture, since more heat is generated than can be removed through the walls of the tubular reactor. The rising temperature increases the rate of decomposition of the free-radical initiators and accelerates polymerization until essentially all of the free-radical initiator is consumed. Thereafter no further heat is generated and the temperature decreases again since the temperature of the reactor walls is lower than that of the reaction mixture. Accordingly, the part of the tubular reactor downstream of an initiator feeding point in which the temperature rises is the reaction zone, while the part thereafter, in which the temperature decreases again, is predominantly a cooling zone. The amount and nature of added free-radical initiators determines how much the temperature increases and allows for the potential adjustment of that value. In some embodiments, the temperature increase is in the range of from 70° C. to 170° C. in the first reaction zone and 50° C. to 130° C. for the subsequent reaction zones, depending on the product specifications and the reactor configuration.

The compression of the reaction gas composition to the polymerization pressure may be carried out by at least two sequentially operating compressors of which a primary compressor first compresses the reaction gas composition to a pressure of from 10 MPa to 50 MPa and a secondary compressor, which is sometimes designated as hyper compressor, then further compresses the reaction gas composition to the polymerization pressure of from 110 MPa to 500 MPa. In some embodiments, the primary compressor and the secondary compressor are multistage compressors. It is further possible to separate one or more stages of one or both of the compressors and divide them into separated compressors. However, in certain embodiments a series of one primary compressor and one secondary compressor is used for compressing the reaction gas composition to the polymerization pressure, wherein the whole primary compressor may be designated as the primary compressor. However, it is common to designate the one or more first stages of the primary compressor, which compress the recycle gas from the low-pressure product separator to the pressure of the fresh ethylene feed, as the booster compressor and then only the one or more subsequent stages as the primary compressor, although they may all be part of one apparatus.

In some embodiments, the polymerization apparatus comprises, beside the polymerization reactor, a high-pressure gas recycle line and a low-pressure gas recycle line for recycling unreacted monomers to the polymerization process. The reaction mixture obtained in the polymerization reactor can be transferred to a first separation vessel, frequently called a high-pressure product separator, which in accordance with the present invention a separation vessel. In certain embodiments, the separator comprises at least one bursting disc, which is held by a bursting disc holder installed "pressure-tight" within a boring in the thickened part of the separation vessel wall, and therein separated into a gaseous fraction and a liquid fraction at a pressure of from 10 MPa to 50 MPa. The gaseous fraction withdrawn from this separation vessel is fed via the high-pressure gas recycle line to the suction side of the secondary compressor. In the high-pressure gas recycle line, the gas may be purified by several purifications steps to remove undesired components such as entrained polymers or oligomers. The liquid fraction withdrawn from the first separation vessel, which usually still comprises dissolved monomers such as ethylene and comonomers in an amount of 20 to 40% of weight, may be transferred to a second separation vessel, frequently called low-pressure product separator, and further separated, at reduced pressure in the range of from 0.1 to 0.5 MPa, in polymeric and gaseous components. The gaseous fraction withdrawn from the second separation vessel is fed via the low-pressure gas recycle line to the primary compressor, such as to the foremost of the stages. Also, the low-pressure gas recycle line usually comprises several purifications steps for purifying the gas from undesired components.

In certain embodiments, the recycled gas coming from the low-pressure gas recycle line is compressed by the first stages of the primary compressor to the pressure of the fresh feed of ethylenically unsaturated monomers, for example ethylene, thereafter combined with the fresh gas feed, with the combined gases further compressed in the primary compressor to the pressure of from 10 MPa to 50 MPa. In further embodiments, the primary compressor comprises five or six compression stages, two or three before adding the fresh gas and two or three after adding the fresh gas. The secondary compressor has, in some embodiments, two stages; a first stage, which compresses the gas from about 30 MPa to about 120 MPa, and a second stage, which further compresses the gas from about 120 MPa to the final polymerization pressure.

Different configurations for suitable polymerization apparatuses such as for example autoclave reactors are also possible.

Figure 1:
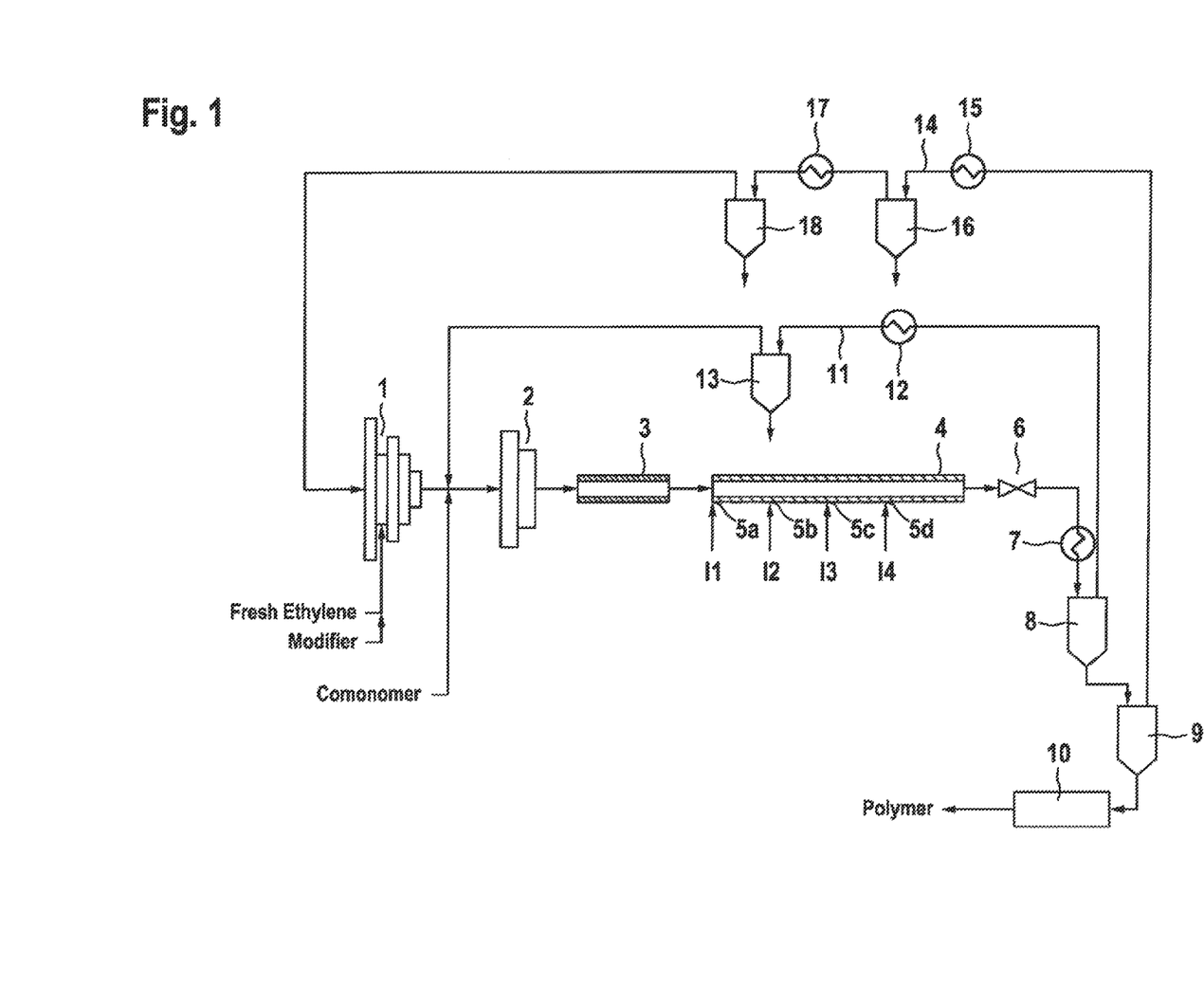
FIG. 1 shows schematically a set-up for a suitable tubular polymerization reactor.

FIG. 1 shows schematically a set-up for a tubular polymerization reactor in accordance with some embodiments of the present disclosure.

In accordance with FIG. 1, fresh ethylene, which may be under a pressure of 1.7 MPa, is compressed to a pressure of about 30 MPa by means of a primary compressor (1) and then compressed to the reaction pressure of about 300 MPa using a secondary compressor (2). The molecular weight regulator is added to primary compressor (1). The reaction mixture leaving the primary compressor (2) is fed to a pre-heater (3), where the reaction mixture is preheated to the reaction start temperature of from about 120° C. to 220° C., and then conveyed to the tubular reactor (4).

The tubular reactor (4) is basically a long, thick-walled pipe with cooling jackets to remove the liberated heat of reaction from the reaction mixture by means of a coolant circuit (not shown). It is usually from about 0.5 km to 4 km long, such as from 1.5 km to 3 km and from 2 km to 2.5 km long. The inner diameter of the pipe may be in the range of from about 30 mm to 120 mm, including from 60 mm to 100 mm.

The tubular reactor (4) shown in FIG. 1 has four spatially separated initiator injection points (5a) to (5d) for feeding initiators or initiator mixtures I1 to I4 to the reactor, as well as four reaction zones. By feeding suitable free-radical initiators, which decompose at the temperature of the reaction mixture, to the tubular reactor the polymerization reaction starts. The generated heat of the reaction increases the temperature of the reaction mixture, since more heat is generated than can be removed through the walls of the tubular reactor. The rising temperature increases the rate of decomposition of the free-radical initiators and accelerates polymerization until all free-radical initiators are consumed. Thereafter no further heat is generated and the temperature decreases again since the temperature of the reactor walls is lower than that of the reaction mixture. Accordingly, the part of the tubular reactor downstream of an initiator injection point, in which the temperature rises, is the reaction zone, while the part thereafter, in which the temperature decreases again, is predominantly a cooling zone.

The amount and nature of added free-radical initiators determines how much the temperature rises and allows for the adjustment of that value. In certain embodiments, the temperature increase in the first reaction zone is set to be in the range of from 70° C. to 170° C. and 50° C. to 130° C. for the subsequent reaction zones, depending on the product specifications and reactor configuration. The reaction mixture leaves the tubular reactor (4) through a high-pressure let-down valve (6) and passes a post reactor cooler (7). Thereafter, the resulting polymer is separated off from unreacted ethylene and other low molecular weight compounds (monomers, oligomers, polymers, additives, solvent, etc.) by means of a first separation vessel (8) and a second separation vessel (9), and discharged and pelletized via an extruder and granulator (10).

The ethylene and comonomers which have been separated off in the first separation vessel (8) may be fed back to the inlet end of the tube reactor (4) in the high-pressure circuit (11) at a pressure, e.g., of about 30 MPa. The ethylene and comonomers are first freed from other constituents in at least one purification stage and then added to the monomer stream between primary compressor (1) and secondary compressor (2). FIG. 1 shows one purification stage comprising a heat exchanger (12) and a separator (13). It is also possible to use a plurality of purification stages. The high-pressure circuit (11) may be used to separate waxes.

The ethylene which has been separated off in the second separation vessel (9), which further comprises, inter alia, the major part of the low molecular weight products of the polymerization (oligomers) and the solvent, is worked up in the low-pressure circuit (14) at an absolute pressure of from about 0.1 to 0.5 MPa in a plurality of separators with a heat exchanger being located between each of the separators. FIG. 1 shows two purification stages consisting of heat exchangers (15) and (17) and separators (16) and (18). It is however also possible to use only one purification stages or more than two purification stages. The low-pressure circuit (14) usually separates oil and waxes.

Different configurations for suitable tubular polymerization reactor are also possible. It can be advantageous to add the monomers not only at the inlet of the reactor tube but to feed them cooled at a plurality of different points to the reactor. This feeding may be done at the beginning of further reaction zones and, in some embodiments, if oxygen and/or air is used as an initiator, which may be added to the monomer feed in the primary compressor.

If the separation vessels of the present disclosure are employed as high-pressure product separators in a high-pressure polymerization of ethylenically unsaturated monomers, the composition to separate in the separation vessel is a reaction mixture obtained by polymerizing ethylenically unsaturated monomers in the presence of free-radical polymerization initiators at temperatures from 100° C. to 350° C. and pressures in the range of from 110 MPa to 500 MPa.

For separating polymeric and gaseous components of this reaction mixture, the steps of entering the reaction mixture into the separation vessel; separating the reaction mixture into in a gaseous fraction and a liquid fraction; withdrawing the gaseous fraction from the top of the separation vessel and withdrawing the liquid fraction from the bottom of the separation vessel are performed. The separation may be carried out at a pressure of from 10 MPa to 50 MPa, such as from 20 MPa to 30 MPa, and at a temperature of from 120° C. to 300° C., including from 220° C. to 290° C. for ethylene homopolymers and from 130° C. to 260° C. for ethylene copolymer. At the conditions of operating the separation vessel, the polymeric components within the separating vessel are in liquid state.

The pressure of the reaction mixture obtained in the high-pressure polymerization may be reduced by passing the mixture through the high-pressure let-down valve arranged downstream of the polymerization reactor. The reaction mixture then usually passes an aftercooler or product cooler, which is supplied with hot water as cooling medium, and fed to the separation vessel for being separated in a liquid fraction and a gaseous fraction. For cooling the reaction mixture and/or removing impurities from the polymer products, it is possible that cold ethylene is added to the reaction mixture prior to entering the first separating vessel. It is also possible to separately feed cold ethylene to the separating vessel. In some embodiments, the reaction mixture is fed into the separation vessel as obtained by the high-pressure polymerization, i.e. without having added to the reaction mixture any further components such as cold ethylene.

The gaseous fraction of the reaction mixture withdrawn from the top of the separating vessel may be fed to the high pressure recycle and, after purification and cooling, returned to the suction side of the secondary compressor. For purifying, the gas exiting the separation vessel may first be fed to an heat exchanger in which the gas is cooled by hot water and thereafter to a further separator, in which most of the carried over polymeric and oligomeric materials and impurities are separated from the gas. By passing additional cooling and separating steps, the gas is usually further purified.

The liquid fraction of the reaction mixture withdrawn from the bottom of the separating vessel is customarily transferred to a second separation vessel, where still dissolved low molecular compounds, mainly ethylene, is further separated off at reduced pressure.

In certain embodiments, the cylindrical part of the separation vessel is efficiently heated by means of coils or a jacket or heating panels, through which high or medium pressure saturated steam or pressurized water at a temperature of from 120-300° C. is passed, and the cone is more intensively heated also by means of coils or a jacket or heating panels, through which high or medium pressure saturated steam or pressurized water at a temperature of from 120-300° C. is passed.

In one embodiment of the present disclosure, the filling level of the liquid fraction in the separation vessel is measured by radiometric level measurement and is controlled by a product discharge valve which operates based on data coming from the level measurement.

The separation vessel according to the present disclosure has the advantage of allowing a dead-space-free installation of the required busting discs by a relatively simple design and they can be constructed economically. It is not required to split the gas leaving the separation vessel and pass it through more than one exit line. Furthermore, a safe installation of the bursting discs is possible without employing separate massive steel blocks.

Figure 2A:
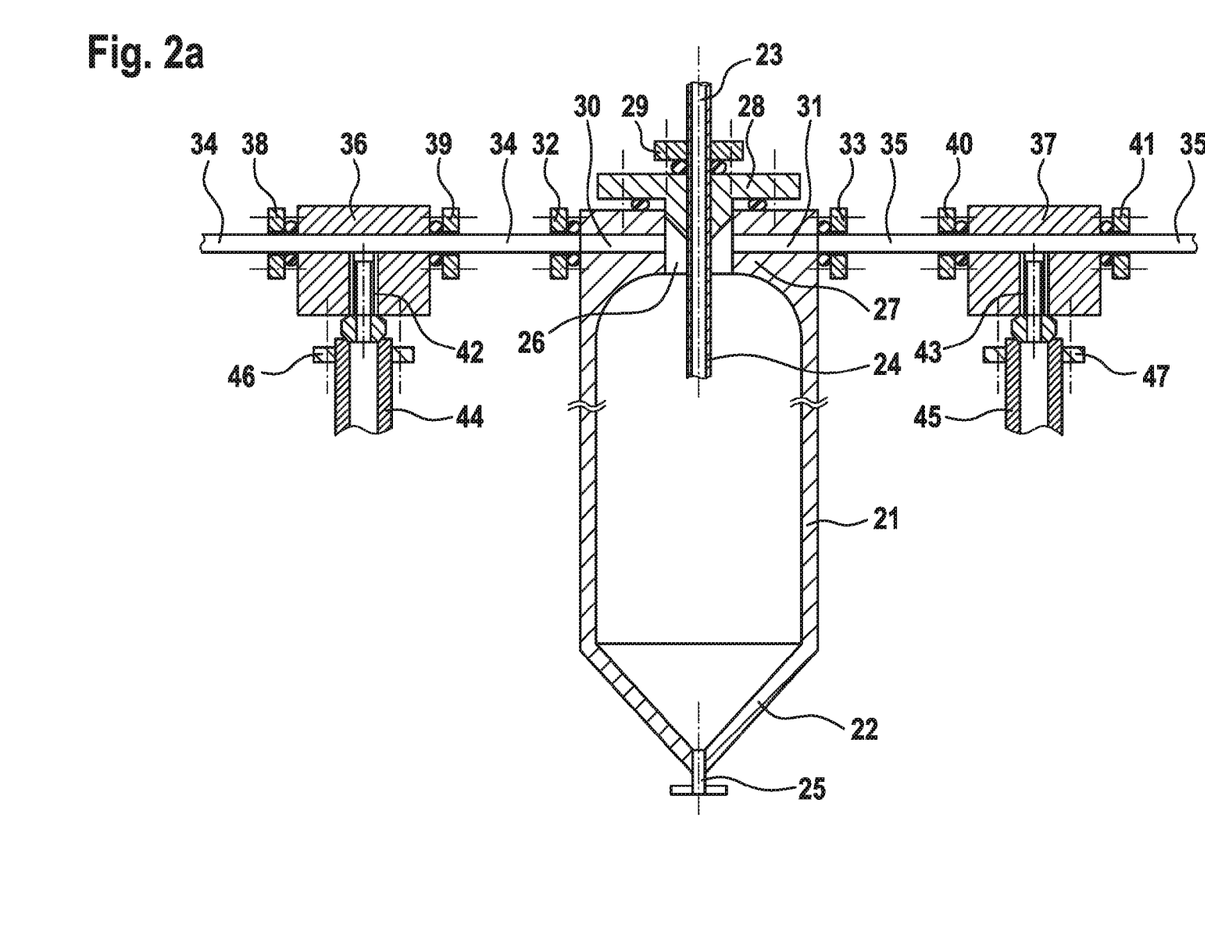
FIG. 2a shows schematically a vertical cross-section of a separation vessel according to the prior art.
Figure 2B:
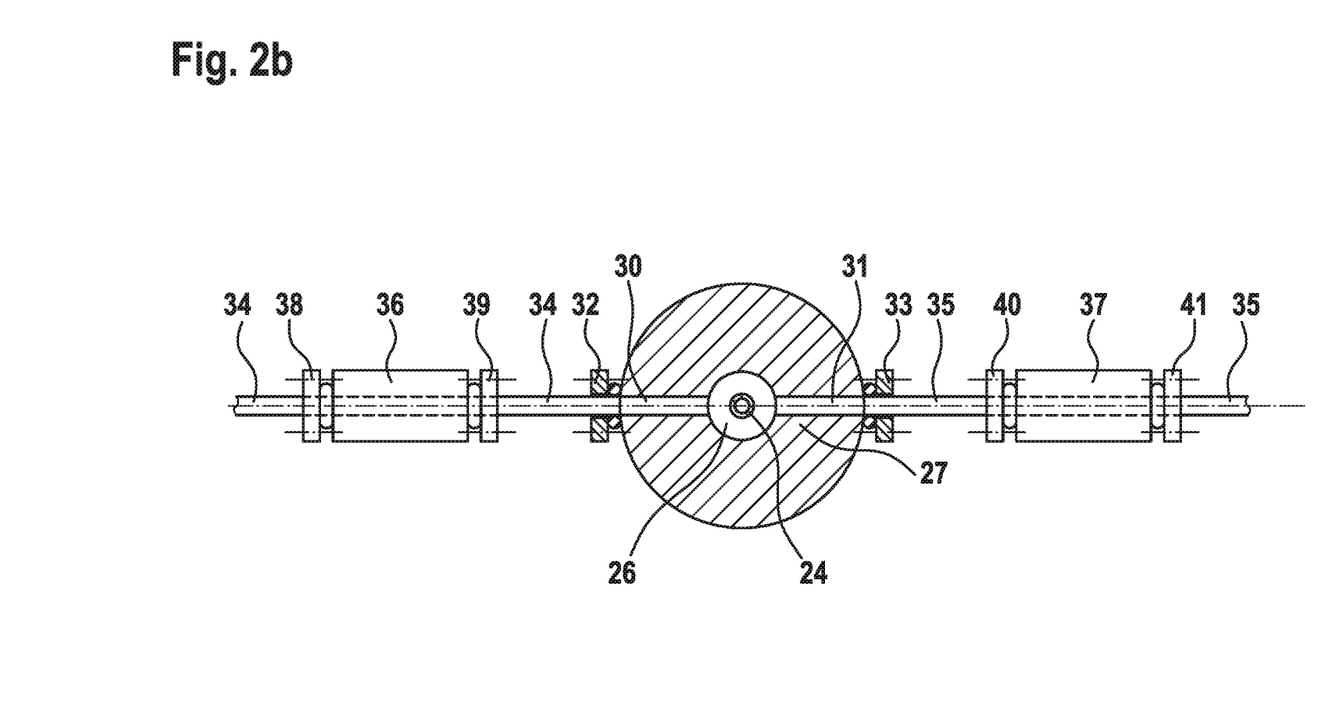
FIG. 2b depicts a schematic horizontal cross-section of this separation vessel according to the prior art.

For illustrating the advantages of the present disclosure, FIG. 2a shows schematically a vertical cross-section of a separation vessel according to the prior art. FIG. 2b depicts a schematic horizontal cross-section of this separation vessel according to the prior art.

The separation vessel (21) has a cylindrical shape and is vertically arranged. The lower end of the separation vessel is formed as a cone (22).

The composition to be separated enters the separation vessel (21) from the top through a piping (23) which transforms into an inlet pipe (24). The separation vessel (21) is partly filled with a liquid fraction, for example with molten polymer containing dissolved gaseous components. The liquid fraction exits the separation vessel at the bottom through piping (25).

At the top, the separation vessel has a manhole (26), which is surrounded by a thickened part of the separation vessel wall (27). The manhole (26) of the separation vessel is closed by a removable cover (28), to which the inlet pipe (24) is removably connected via flange (29). A cover (28) in turn is flanged to the thickened part of the separation vessel wall (27).

The thickened part of the separation vessel wall (27) has two borings (30) and (31) to which, via flanges (32) and (33), two pipes (34) and (35) are connected through which the gaseous fraction leaves the separation vessel.

For installing bursting discs, two massive steel blocks (36) and (37) are inserted into pipes (34) and (35) via flanges (38) and (39) and flanges (40) and (41). Steel blocks (36) and (37) have respectively borings (42) and (43), into which bursting disc holders with integrated bursting discs are installed. To release the content of the separation vessel after a rupture of the busting disc to a safe location, vent lines (44) and (45) are connected to the steel blocks (36) and (37) via flanges (46) and (47). The bursting discs are located at the inner end of the bursting disc holders and installed "dead-space-free" in the outlet piping for transferring the gaseous fraction from the separation vessel (21) to the high-pressure gas recycle line (not shown in FIGS. 2a and 2b).

Figure 3:
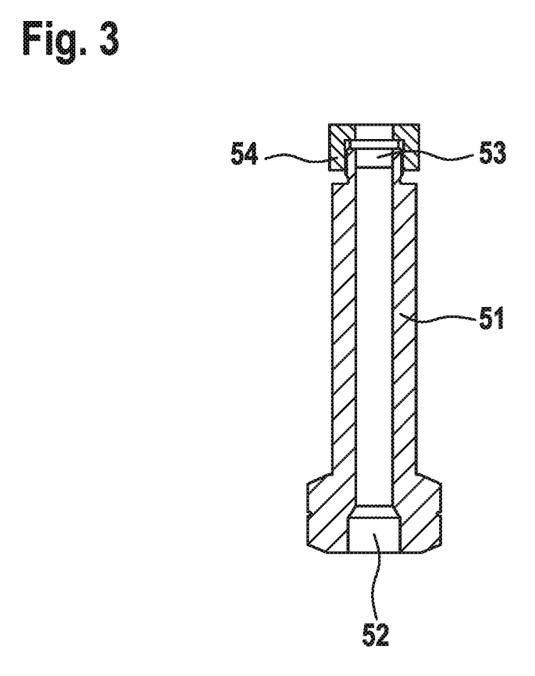
FIG. 3 shows schematically a bursting disc holder with integrated bursting disc as used as well according to the prior art as in separation vessels according to the present disclosure.

FIG. 3 shows schematically a bursting disc holder with integrated bursting disc according to the prior art as in separation vessels according to the present disclosure.

The bursting disc holder is basically an extended body (51) which has an opening (52) at one end and which thickens at the open end. The bursting disc (53) is attached to the other end of the body and fixed by an assembly nut (54). To release the content of the separation vessel after a rupture of the busting disc (53) to a safe location, a vent line (not shown) is usually connected to the bursting disc opening (52).

Figure 4A:
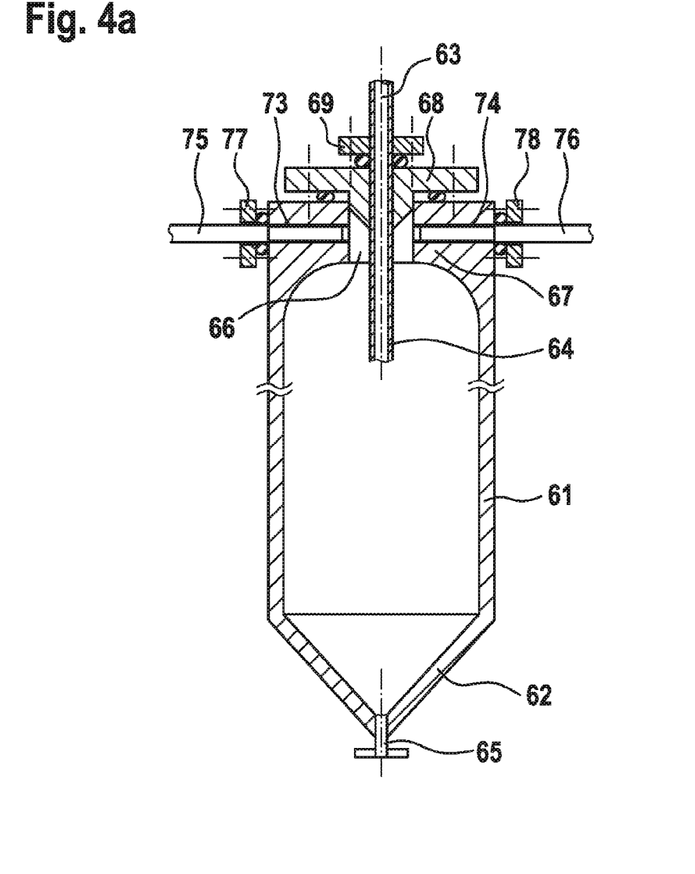
FIG. 4a shows schematically a vertical cross-section of a separation vessel according to the present disclosure.
Figure 4B:
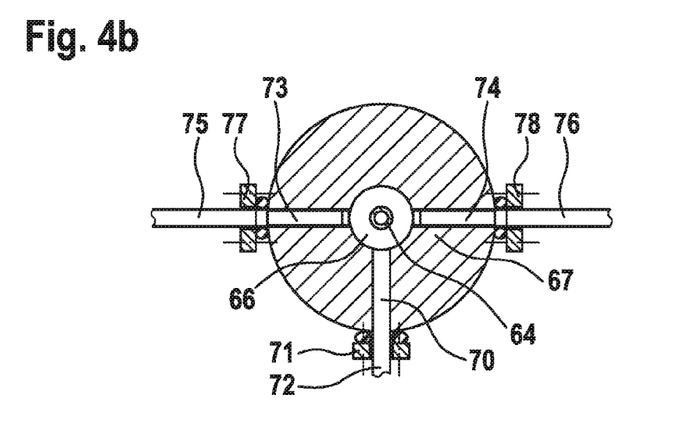
FIG. 4b depicts a schematic horizontal cross-section of this separation vessel according to the present disclosure.

FIG. 4a shows schematically a vertical cross-section of a separation vessel according to the present disclosure. FIG. 4b depicts a schematic horizontal cross-section of this separation vessel according to the present disclosure.

Separation vessel (61) has a cylindrical shape and is vertically arranged. The lower end of the separation vessel is formed as a cone (62).

The composition to be separated enters the separation vessel (61) from the top through a piping (63) which transforms into an inlet pipe (64). The separation vessel (61) is partly filled with a liquid fraction, for example with molten polymer containing dissolved gaseous components. The liquid fraction exits the separation vessel at the bottom through piping (65).

At the top, the separation vessel has a manhole (66), which is surrounded by a thickened part of the separation vessel wall (67). The manhole (66) of the separation vessel is closed by a removable cover (68), to which the inlet pipe (64) is removably connected via a flange (69). A cover (68) in turn is flanged to the thickened part of the separation vessel wall (67).

The thickened part of the separation vessel wall (67) has one boring (70) to which, via flanges (71), a pipe (72) is connected through which the gaseous fraction leaves the separation vessel.

The thickened part of the separation vessel wall (67) has two additional borings (73) and (74) into which bursting disc holders with integrated bursting discs are installed. To release the content of the separation vessel after a rupture of the bursting disc to a safe location, vent lines (75) and (76) are connected to the thickened part of the separation vessel wall (67) via flanges (77) and (78). The bursting discs are located at the inner end of the bursting disc holders and installed "dead-space-free" in the manhole of the separation vessel, through which the gaseous fraction firstly streams before leaving the separation vessel (61) through boring (70) and outlet line (72).

A comparison of FIGS. 2a and 2b with FIGS. 4a and 4b shows that separation vessels according to the present disclosure allow for a much simpler design which can be constructed more economically, e.g. the installation of separate massive steel blocks can be advantageously avoided such that it is no longer necessary to provide such massive steel blocks or to install structures, which allow a safe fixation of the steel blocks for catching and withstanding the forces which arise from the flow dynamics when a bursting disc ruptures.

The present disclosure also refers to a process for separating, at a pressure of from 10 MPa to 50 MPa, and preferably at a temperature of from 120° C. to 300° C., a composition comprising liquid components and gaseous components into a liquid fraction and a gaseous fraction, wherein the separation is carried out in such a separation vessel. In some embodiments, the composition is a reaction mixture obtained by polymerizing ethylenically unsaturated monomers in the presence of free-radical polymerization initiators at temperatures from 100° C. to 350° C. and pressures in the range of from 110 MPa to 500 MPa.

The separation vessel of the present disclosure can advantageously be utilized in a process for preparing ethylene homopolymers or copolymers at high pressures. Accordingly, the present disclosure also refers to a process for preparing ethylene homopolymers or copolymers from ethylenically unsaturated monomers in the presence of free-radical polymerization initiators at temperatures from 100° C. to 350° C. and pressures in the range of from 110 MPa to 500 MPa in a polymerization reactor, wherein the separation of the reaction mixture obtained by the polymerization is carried out in such a separation vessel. The separation may be the first separation of the reaction mixture obtained by the polymerization, and the separation may be carried out at a pressure of from 10 MPa to 50 MPa.

The polymerization may be carried out in one or more tubular reactors or autoclave reactors or combinations of such reactors.

What is claimed is:

1. A vessel for separating, at a pressure of from 10 MPa to 50 MPa, a composition comprising liquid components and gaseous components into a liquid fraction and a gaseous fraction, wherein
   the separation vessel has a cylindrical shape and is vertically arranged,
   the separation vessel has at its top a manhole, which is surrounded by a thickened part of the separation vessel wall;
   the separation vessel is equipped with an inlet pipe for introducing the composition into the separation vessel, with a boring for withdrawing a gaseous fraction from the top of the separation vessel, and with an outlet for withdrawing a liquid fraction from the bottom of the separation vessel; and
   the separation vessel comprises at least one bursting disc which is held by a bursting disc holder which is installed pressure-tight within a boring in the thickened part of the separation vessel wall.

2. The vessel according to claim 1, wherein the bursting disc holder is vertically installed in the thickened part of the separation vessel wall.

3. The vessel according to claim 1, wherein the bursting disc holder is fixed to the separation vessel wall by flange connection from the outside.

4. The vessel according to claim 1, wherein the bursting disc is arranged at the inner end of the boring in the thickened part of the separation vessel wall in a way that the surface of the bursting disc assembly in contact with the gaseous fraction within the separation vessel and the wall surface of the manhole are arranged in one plane.

5. The vessel according to claim 1, wherein the separation vessel has an L/D ratio of from 4 to 10.

6. A process for separating, at a pressure of from 10 MPa to 50 MPa, a composition comprising liquid components and gaseous components into a liquid fraction and a gaseous fraction, wherein the separation is carried out in a separation vessel according to claim 1.

7. The process according to claim 6, wherein the separation is carried out at a temperature of from 120° C. to 300° C.

8. The process according to claim 6, wherein the composition is a reaction mixture obtained by polymerizing ethylenically unsaturated monomers in the presence of free-radical polymerization initiators at temperatures from 100° C. to 350° C. and pressures in the range of from 110 MPa to 500 MPa.

9. A process for preparing ethylene homopolymers or copolymers from ethylenically unsaturated monomers in the presence of free-radical polymerization initiators at temperatures from 100° C. to 350° C. and pressures in the range of from 110 MPa to 500 MPa in a polymerization reactor, wherein the separation of the reaction mixture obtained by the polymerization is carried out in a separation vessel according to claim 1.

10. The process according to claim 9, wherein the separation is the first separation of the reaction mixture obtained by the polymerization and the separation is carried out at a pressure of from 10 MPa to 50 MPa and a temperature of from 120° C. to 300° C.

11. The process according to claim 9, wherein the polymerization is carried out in one or more tubular reactors or autoclave reactors or combinations of such reactors.

\* \* \* \* \*